Oct. 18, 1927. 1,645,720
C. PFANSTIEHL
METHOD OF AND APPARATUS FOR CONTROLLING BATTERY CHARGERS
Filed July 20, 1925
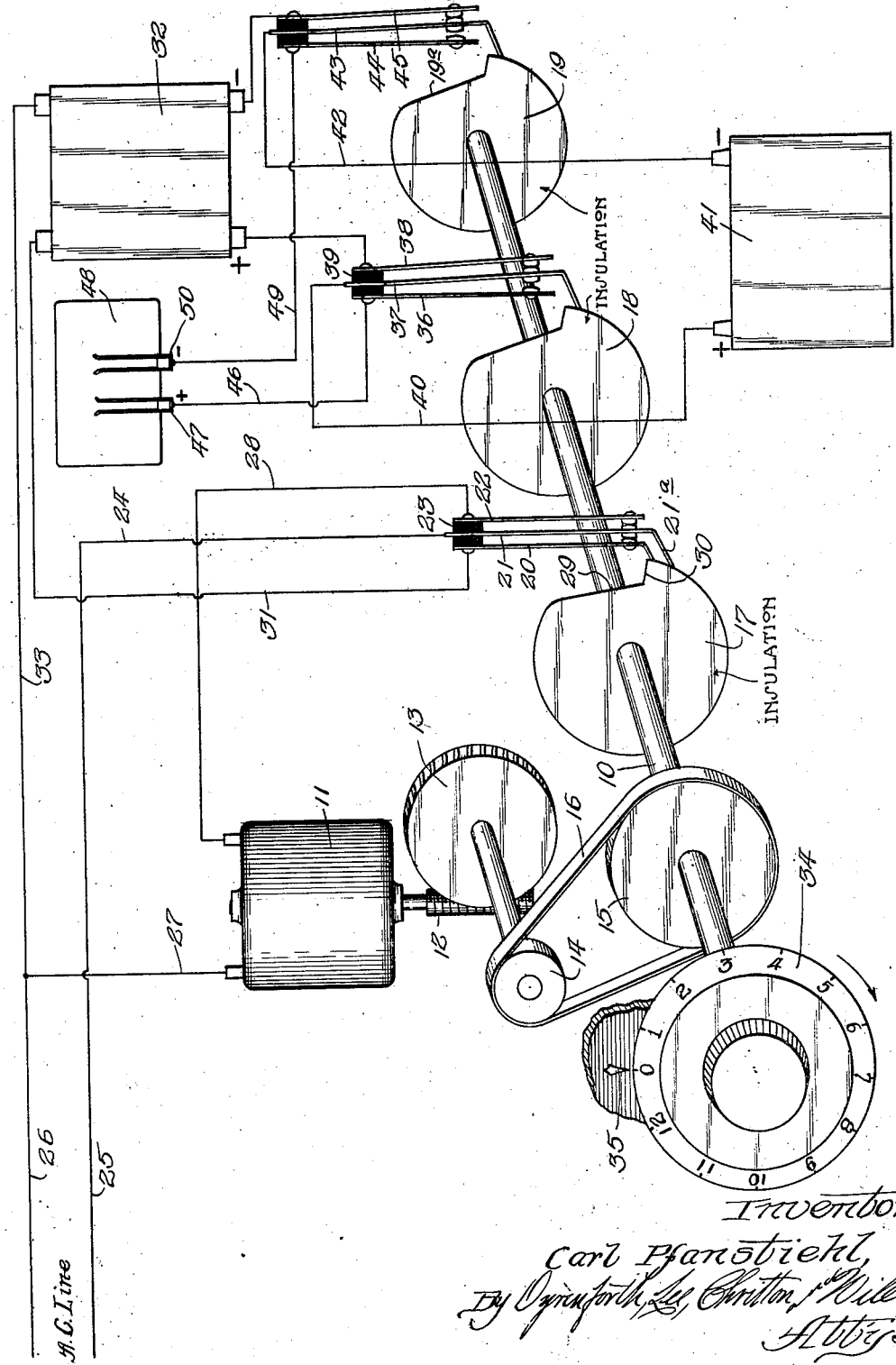

Patented Oct. 18, 1927.

1,645,720

UNITED STATES PATENT OFFICE.

CARL PFANSTIEHL, OF HIGHLAND PARK, ILLINOIS, ASSIGNOR TO PFANSTIEHL RADIO COMPANY, A CORPORATION OF ILLINOIS.

METHOD OF AND APPARATUS FOR CONTROLLING BATTERY CHARGERS.

Application filed July 20, 1925. Serial No. 44,802.

This invention relates to method of and apparatus for controlling storage battery chargers and is particularly adapted to be used in connection with a radio receiving set of which the charger is a part.

An object of the invention is to provide an efficient means for charging a storage battery for a certain period of time and for automatically disconnecting the battery from the charger at the end of said period.

Another object is to provide a means for use in connection with a radio receiving set, for charging the storage battery forming a part of the radio set and, when the period of charging has been finished to automatically disconnect the charger and to connect the battery to the radio receiving set, so that during the period of charging the current from the charger cannot be applied to the receiving set and, after the period of charging is over the set will be reconnected to the battery so that it is ready for operation without any further manipulation.

These and other objects are accomplished by the invention which is fully described in the following specification and shown in the accompanying drawings in which the figure is a diagrammatic view showing the controller shaft and the parts carried thereby in perspective.

The embodiment illustrated comprises primarily a controller shaft 10 which is driven by an induction disk motor 11 through a suitable series of reduction gears 12, 13, 14 and 15 or the like, the latter are shown as pulleys driven by means of belts 16 so as to permit slippage for a purpose which will later appear.

Cams 17, 18 and 19 of insulating material are carried by the controller shaft 10, the latter being journaled in suitable bearings, not shown. The cam 17 has a series of contact fingers 20, 21 and 22 which are made of spring metal and are carried at their upper end by means of an insulation block 23 which is rigidly mounted on the controller frame (not shown). The controller finger 21 is connected by means of a lead 24 with one side of the alternating current line 25 while the other side of this line 26 is connected through a lead 27 with the induction disk motor 11. The other side of this motor is connected through a lead 28 with the controller finger 22. The controller finger 21 has an extension 21ª bearing upon the face of the cam 17 which is concentric with respect to the controller shaft 10 except for the notch 29 which terminates in an abrupt shoulder 30. From the foregoing it will be observed that when the cam 17 is turned so that any portion of its circular face lies beneath the extension 21ª of the contact finger 21 this finger will be in electrical contact with the finger 22, thereby completing the circuit through the disk motor 11 and causing it to drive the control shaft 10.

The control finger 20 is connected by means of a lead 31 with a battery charger 32 of any well known type, the other side of the charger 32 being connected through a lead 33 with the alternating current line 26. So long therefore as the finger 20 rides upon the concentric surface of the cam 17 it is in electrical contact with the central finger 21 and consequently current will flow from the alternating line 25, 26 through the charger 32.

As shown in the figure, the control shaft 10 is turned very slowly in a clockwise direction and the lower end of the finger 20 is about to drop off the shoulder 30. When this happens the finger 20 will spring away from the finger 21, thereby disconnecting the charger 32 from the line 25, 26.

As the controller shaft continues to revolve the end 21ª of the controller finger 21 drops off the shoulder 30, thereby breaking connection with the finger 22 and consequently stopping the induction disk motor 11. At the same time the finger 21 does not spring down far enough to make contact with the finger 20 so that with the two fingers 20 and 21 in the cam notch 29 no current from the line 25, 26 flows to the motor 11 or charger 32.

The approximate timing of the controller shaft 10 is accomplished by placing a dial 34 thereon which is graduated approximately into hours and is rotatable before a fixed marker 35 secured adjacent the edge of the dial to a fixed part of the apparatus.

The zero of the dial 34 corresponds to the position just described wherein the finger 20 has just slipped over the shoulder 30 into the notch 29 and the numbers 1, 2, 3 etc., corresponds to approximate hours of charging. With the apparatus which will later be described, that which has been previously described may be used as part of a regular battery charging outfit.

To set such a device for a definite period of charging, the operator turns the dial 34 in a clockwise direction until that number appears beneath the pointer 35 which corresponds to the number of hours the charger is to operate. To do this slippage between the shaft 10 and the motor 11 may be accomplished in any desired manner, as by means of pulleys 14 and 15 and a belt 16. As soon as the cam 17 has been turned sufficiently to raise the fingers 20 and 21 so that they ride upon the circular portion of the cam, current from the line will drive the motor 11 and at the same time current will pass through the charger 32. The motor 11 will then continue to slowly drive the controller shaft 10 in a clockwise direction until the finger 20 again slips off the shoulder 30 thereby disconnecting the charger 32 and a little later the end 21ª of the finger 21 also slips off the shoulder 30 when the motor 11 will again be disconnected from the line 25, 26 and will stop. It will be observed that in this much of the apparatus as has previously been described no connection from the charger to the battery has been described, it being understood that the charger is connected to the battery in the usual manner by direct leads.

The apparatus for simultaneously controlling the various connections to the battery, the charger and the radio set will now be described so as to make the apparatus much more complete and automatic in its operation.

The cams 18 and 19 are the same in form as the cam 17. The cam 18 operates a switch having fingers 36, 37 and 38 which are held in a rigid insulating block 39, the central finger 37 only making contact with the face of the cam 18. This central finger 37 is connected through a lead 40 with the positive terminal of the battery 41, while the negative terminal of this battery is connected through a lead 42 with the central finger 43 which bears upon the face of the cam 19. The contact fingers 44 and 45 are so spaced as to be selectively in contact with the finger 43 depending upon whether this finger rides upon the circular part of the cam 19 or is in the depression 19ª.

The finger 36 is connected through a lead 46 with the positive terminal 47 of a radio set 48, while the finger 44 is connected through a lead 49 with the negative terminal 50 of the radio set 48. The fingers 38 and 45 are connected to the positive and negative terminals of the charger 32.

It will be observed that the shoulders of the cams 18 and 19 are set to operate at substantially the same time and that the fingers 37 and 43 will slip off these shoulders after the finger 20 has passed over the shoulder 30 of the cam 17 and before the end 21ª of the finger 21 has reached the shoulder 30.

Thus, with the motor 11 and the charger 32 in operation, the latter charging the battery 41 as is shown in the drawing, the finger 20 is operated first and disconnects the charger 32 from the alternating current line 25, 26 as has previously been explained. As the controller shaft continues to rotate, the contact fingers 37 and 43 pass over the shoulder of the cams 18 and 19, thereby permitting the fingers 37 and 43 to spring out of contact with the fingers 38 and 45 respectively thus disconnecting the battery 41 from the charger 32 and permitting them to spring into contact with the fingers 36 and 44, thereby switching the battery 41 back on the radio set 48.

Thus it will be understood that the charger 32, the battery 41 and this controlling apparatus may be made a part of the radio receiving set. To charge the battery 41 for a period of five hours for example, when the shaft 10 is standing in the normal position with the fingers 21ª, 37 and 43 at the bottoms of the notches in the cams 17, 18 and 19, the operator turns the dial 34 until the numeral 5 of the graduations is beneath the pointer 35. The contact fingers 21ª, 37 and 43 will then be riding upon the circular portions of the cams, the charger 32 will charge the battery 41 which is then completely disconnected from the set 48 until such time as the motor 11 will turn the controller shaft 10 until the contact fingers 21ª, 37 and 43 again have passed over the shoulders of the controller cams. If it is desired to use the radio set after it has been placed on the charger, the operator turns the dial 34 in a clockwise direction until the fingers 21ª, 37 and 43 have passed over the shoulders of the cams when the battery 41 is again back on the radio set 48, at which time the dial 34 stands with its zero point substantially beneath or a little to the right of the pointer 35.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In combination, a storage battery charger, a source of alternating current, a motor driven by said source of current, a cam driven by said motor, a switch operable by said cam, said switch being adapted to pass electric current from said source to said charger and motor for a predetermined period, to disconnect said charger from said source at a predetermined point in said cam, and to disconnect said motor from said source at a later predetermined point.

2. In combination, a storage battery charger, a source of alternating current, a motor driven by said source of current, a cam driven by said motor, a switch operable by said cam, said switch being adapted to pass electric current from said source to said charger and motor for a predetermined period, to disconnect said charger from said source at a predetermined point in said cam, and to disconnect said motor from said source at a later predetermined point while keeping said charger disconnected.

3. In combination, a load, a storage battery, a storage battery charger, a source of electric current, manually operable means for switching said storage battery from the load to said charger, said means including a controller shaft and a motor operable from said source of electric current for driving said shaft, cams on said shaft, switches operable by said cams, one of said switches connecting said motor to said source of current for a predetermined length of time, another switch controlling the connection between said charger and source of current, and another switch operable to switch the battery connections from the load to the charger and back to the load.

4. In combination, a load, a storage battery, a storage battery charger, a source of electric current, manually operable means for switching said storage battery from the load to said charger, said means including a controller shaft and a motor operable from said source of electric current for driving said shaft, cams on said shaft, switches operable by said cams, one of said switches connecting said motor to said source of current for a predetermined length of time, another switch controlling the connection between said charger and source of current, and another switch operable to switch the battery connections from the load to the charger and back to the load, said last mentioned switch taking place after the charger is disconnected from said line.

5. In combination, a load, a storage battery, a storage battery charger, a source of electric current, manually operable means for switching said storage battery from the load to said charger, said means including a controller shaft and a motor operable from said source of electric current for driving said shaft, cams on said shaft, switches operable by said cams, one of said switches connecting said motor to said source of current for a predetermined length of time, another switch controlling the connection between said charger and source of current, another switch operable to switch the battery connections from the load to the charger and back to the load, said last mentioned switch taking place after the charger is disconnected from said line, and means for preventing said cam shaft being reversely rotated through that portion of its revolution when the shifting takes place.

6. In combination, a load, a storage battery, a storage battery charger, a source of electric current, manually operable means for switching said storage battery from the load to said charger, said means including a controller shaft and a motor operable from said source of electric current for driving said shaft, cams on said shaft, switches operable by said cams, one of said switches connecting said motor to said source of current for a predetermined length of time, another switch controlling the connection between said charger and source of current, another switch operable to switch the battery connections from the load to the charger and back to the load, said last mentioned switch taking place after the charger is disconnected from said line, and a knob on said shaft graduated to indicate the approximate hours of charging before said cams operate said switches.

7. In combination, a load, a storage battery therefor, a storage battery charger, a source of alternating current, a motor operable by said current, a shaft driven by said motor, cams on said shaft, a switch operable by one of said cams for connecting said charger to the source of current for a predetermined length of time, a second switch operably connected to the first mentioned switch and operable by the same cam for controlling the operation of said motor, and switches operable by the other cams for switching said battery from the load to the charger during the time the charger is in operation and for switching the battery from the charger back to the load after the charger has been disconnected from the source of current.

8. In combination, a storage battery charger, a source of alternating electric current, a cam, a motor for driving said cam, a switch operable by said cam, said switch being adapted to pass electric current from said source to said charger and to said motor to operate the same, and at a predetermined point in said cam to disconnect said charger from said source, said cam then operating to stop said motor.

In testimony whereof I have hereunto set my hand and seal this 11th day of July, 1925.

CARL PFANSTIEHL.